(12) United States Patent
Sutton

(10) Patent No.: US 8,398,914 B2
(45) Date of Patent: Mar. 19, 2013

(54) SYSTEMS AND METHODS FOR DEFORMING AN OUTER WALL OF PIPE

(75) Inventor: Gerald S. Sutton, Hamilton, OH (US)

(73) Assignee: Advanced Drainage Systems, Inc., Hilliard, OH (US)

( * ) Notice: Subject to any disclaimer, the term of this patent is extended or adjusted under 35 U.S.C. 154(b) by 192 days.

(21) Appl. No.: 12/721,196

(22) Filed: Mar. 10, 2010

(65) Prior Publication Data

US 2011/0221090 A1 Sep. 15, 2011

(51) Int. Cl.
*B29C 49/04* (2006.01)
*B29C 49/22* (2006.01)

(52) U.S. Cl. ........ 264/505; 264/515; 264/571; 264/154; 264/155

(58) Field of Classification Search .................. None
See application file for complete search history.

(56) References Cited

U.S. PATENT DOCUMENTS

| 7,988,438 B2 * | 8/2011 | Sutton et al. | 425/113 |
| 2010/0089074 A1 * | 4/2010 | Sutton et al. | 62/63 |
| 2010/0224306 A1 * | 9/2010 | Sutton et al. | 156/64 |

* cited by examiner

*Primary Examiner* — Monica A Huson
(74) *Attorney, Agent, or Firm* — Finnegan, Henderson, Farabow, Garrett & Dunner LLP

(57) ABSTRACT

A method of deforming an outer wall of polymer pipe is provided. The method includes: forming dual-wall pipe having a smooth wall and a corrugated wall; extruding an outer wall of pipe onto the corrugated wall of the dual-wall pipe; penetrating the outer wall of pipe with a vacuum punch; and drawing a vacuum between the corrugated wall and the outer wall via the vacuum punch; wherein the vacuum drawn between the corrugated wall and the outer wall causes the outer wall to deform in a direction towards the corrugated wall. An apparatus for forming an outer wall of pipe and a mold configured to form a coupling preform in a segment of continuously-extruded and molded polymer pipe are also provided.

24 Claims, 13 Drawing Sheets

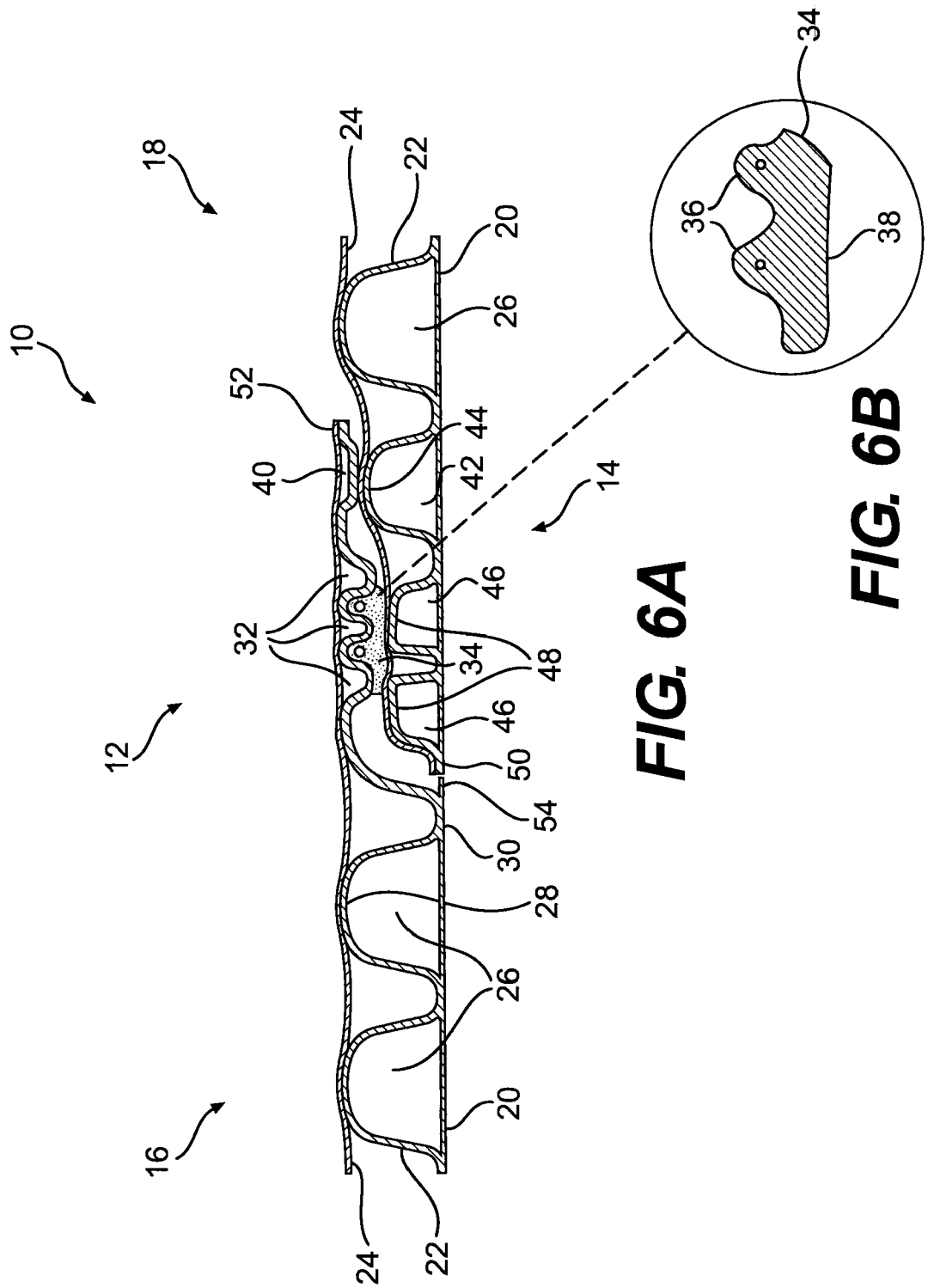

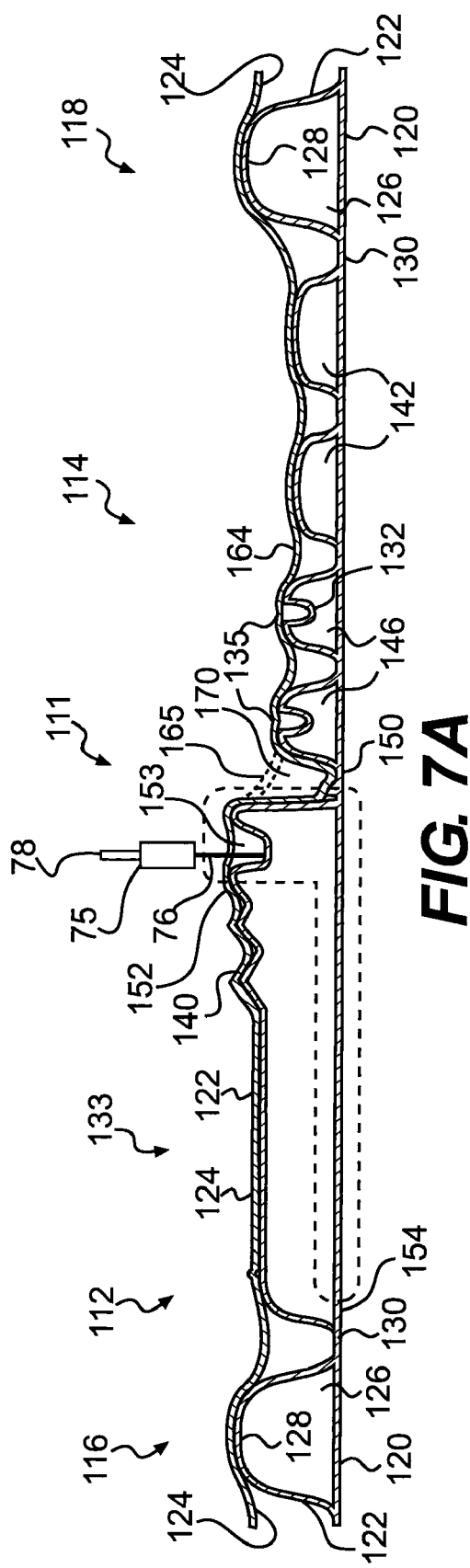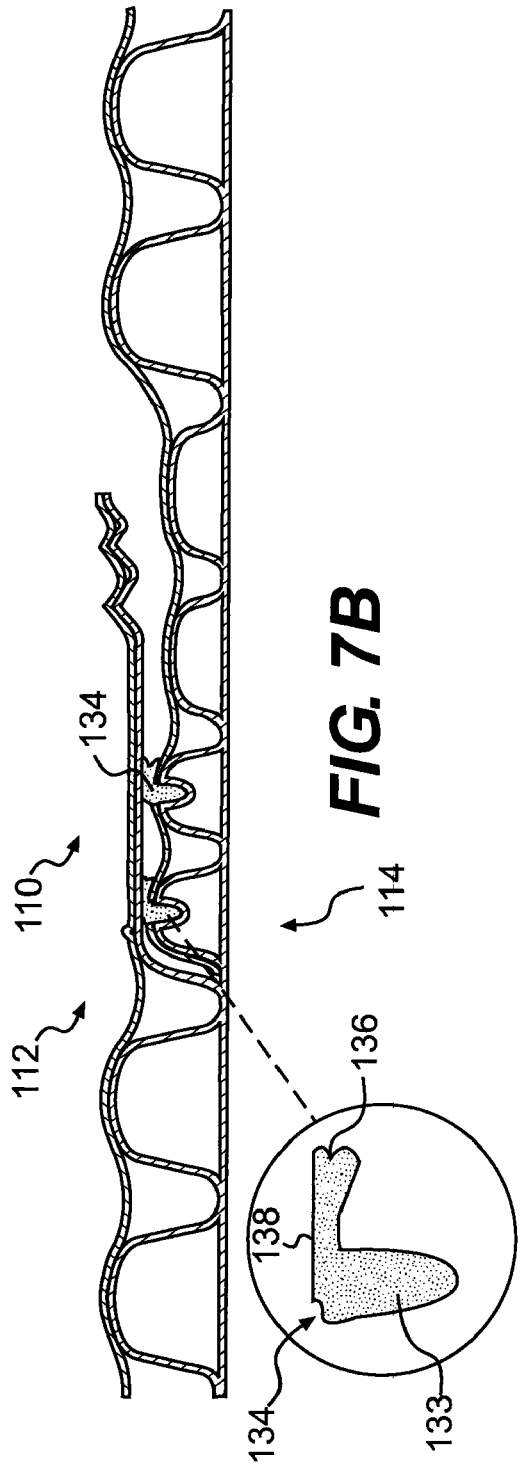
FIG. 7A
FIG. 7B

SYSTEMS AND METHODS FOR DEFORMING AN OUTER WALL OF PIPE

TECHNICAL FIELD

The present invention relates to manufacturing three-wall corrugated pipe walls, and more particularly, to systems and methods for deforming an outer wall of three-wall corrugated pipe.

BACKGROUND

Corrugated pipe sections are used in the drainage of water-saturated soil in various agricultural, residential, recreational, or civil engineering and construction applications, such as for storm sewers. Corrugated pipe sections are also used for sanitary sewer pipe. Traditionally, drainage and sewer pipe was made from clay, concrete, or steel, which caused the pipe to be heavy, expensive, and brittle. In order to improve the cost-effectiveness, durability, and ease-of-installation of pipes, it is now common in the art to manufacture such pipes from alternative materials including various polymers and polymer blends.

Such plastic pipe is generally extruded, molded, and cut to form relatively light, manageable, and transportable sizes of drainage pipe sections, ranging from a few feet to many yards in length. Once these plastic pipe sections are transported to their desired installation location, they are assembled lengthwise by the installation of joints, adhesives, or other coupling means. This coupling process has generally been complex, requiring the transportation of many tools and supplies to the job site, and has required many man-hours for completion.

For example, one method of assembly involves the formation of a wide-diameter bell at one end of each plastic pipe section. During the pipe manufacturing process, an apparatus known as a "beller" is used to radially expand the end of the pipe, forming an expanded bell-shaped structure, such that the opposite end of an adjacent pipe section may be inserted into the expanded bell-shaped end. This process has several disadvantages.

First of all, these pipe bells are generally weakened during their expansion and require additional means of reinforcement, such as external straps, hinged brackets, overlapping wraps, shrink-wrap layers, or a combination of such reinforcement means. In some instances, more material must be used at the pipe bell ends to compensate for reduced strength, thereby increasing weight and expense. Moreover, because the pipe bells are expanded to diameters larger than the central portion of the pipe, it becomes necessary to dig trenches that can accommodate the larger bell. Finally, these bells and other known coupling means require precise and careful excavation, installation, and backfill, to avoid misalignment between pipe sections during assembly and placement. The improper installation of these coupling means often results in joint failure, buckling, and an inability to form a water-tight seal between adjacent pipe sections. These problems, which are known to exist in relation to single- and dual-wall pipe, can be even more troublesome in three-wall pipe applications. For example, it may be substantially more difficult and expensive to form a bell-shaped end on a section of three-wall, corrugated pipe, due to increased material weight and stiffness.

One example of an improved water-tight, in-line, bell and spigot, which can be used for coupling sections of three-wall, corrugated pipe, was disclosed in U.S. patent application Ser. No. 11/941,605, filed by Gerald S. Sutton et al. on Nov. 16, 2007. In order to create pipe sections having such a water-tight, in-line bell and spigot at either end, there is a need to extrude an outer wall of plastic onto a dual-wall corrugated pipe having in-line bell and spigot preforms. The three-wall pipe can then be cut between adjacent in-line bells and spigots. However, the extruded outer wall often drapes onto the dual-wall corrugated pipe in a configuration that is less than optimal for dividing the pipe into sections by cutting the pipe between adjacent in-line bells and spigots.

Accordingly, there is a need for an apparatus and method for deforming an outer wall of pipe.

SUMMARY

It is an object of the present invention to provide such an apparatus and method for deforming an outer wall of pipe.

One exemplary embodiment of the present disclosure provides a method of deforming an outer wall of polymer pipe. The method includes: forming dual-wall pipe having a smooth wall and a corrugated wall; extruding an outer wall of pipe onto the corrugated wall of the dual-wall pipe; puncturing the outer wall of pipe with a vacuum punch; and drawing a vacuum between the corrugated wall and the outer wall via the vacuum punch; wherein the vacuum drawn between the corrugated wall and the outer wall causes the outer wall to deform in a direction towards the corrugated wall.

Another exemplary embodiment of the present disclosure provides an apparatus for deforming an outer wall of pipe. The apparatus includes: a punch housing having a first internal bore that extends from a first surface of the housing to a second surface of the housing, and a second internal bore that extends from a third surface of the housing to intersect the first internal bore; a punch actuator disposed coaxially with the first internal bore at the first surface; a hollow needle disposed coaxially with the first internal bore at the second surface; and a first vacuum source disposed in fluid communication with the second internal bore, such that a vacuum is selectively applied to the hollow needle when the punch actuator brings the hollow needle into fluid communication with the second internal bore.

Yet another exemplary embodiment of the present disclosure provides a mold configured to form a coupling preform in a segment of continuously-extruded and molded polymer pipe. The mold includes: an exterior surface defining a mold housing; an interior surface defining a mold cavity; and a coupling preform profile defining the interior surface of the mold cavity. The coupling preform profile includes: a bell portion profile having bell corrugation profiles; a spigot portion profile having spigot corrugation profiles; and a vacuum channel profile extending from the bell portion profile to the spigot portion profile; wherein the coupling preform profile is configured to shape a corrugated wall of the polymer pipe such that an outer wall extruded onto the pipe can be drawn down to contact the corrugated wall when a vacuum is applied to a vacuum channel formed in the corrugated wall by the vacuum channel profile.

In this respect, before explaining at least one embodiment of the disclosure in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

The accompanying drawings illustrate certain exemplary embodiments of the disclosure, and together with the description, serve to explain the principles of the invention.

As such, those skilled in the art will appreciate that the conception upon which this disclosure is based may readily be utilized as a basis for designing other structures, methods, and systems for carrying out the several purposes of the present invention. It is important, therefore, to recognize that the claims should be regarded as including such equivalent constructions insofar as they do not depart from the spirit and scope of the present invention.

BRIEF DESCRIPTION OF THE DRAWINGS

FIG. 6A is a partial, cross-sectional view of an exemplary in-line bell and spigot coupling for joining two segments of three-wall, corrugated pipe;

FIG. 6B is a cross-sectional view of an exemplary gasket for use in the in-line bell and spigot coupling of FIG. 6A;

FIG. 7A is a partial, cross-sectional view of an alternative embodiment of an exemplary coupling preform for joining two segments of three-wall, corrugated pipe, and a punch for deforming an outer wall of the three-wall, corrugated pipe;

FIG. 7B is a partial, cross-sectional view of an alternative embodiment of an exemplary in-line bell and spigot coupling for joining two segments of three-wall, corrugated pipe;

DESCRIPTION OF THE EXEMPLARY EMBODIMENTS

Reference will now be made in detail to the exemplary embodiments described above and illustrated in the accompanying drawings.

In the manufacture of three-wall, corrugated, polymer pipe, it may be desirable to form an inline coupling portion by which two adjacent sections of the pipe may be severed and joined. For example, adjacent male and female coupling portions may be formed into the three walls of an in-line coupling preform for joining sections of continuously-extruded polymer pipe. The pipe may then be cut between adjacent male and female coupling portions of a coupling preform and then joined by inserting a male coupling portion into each female coupling portion.

Figure 1:
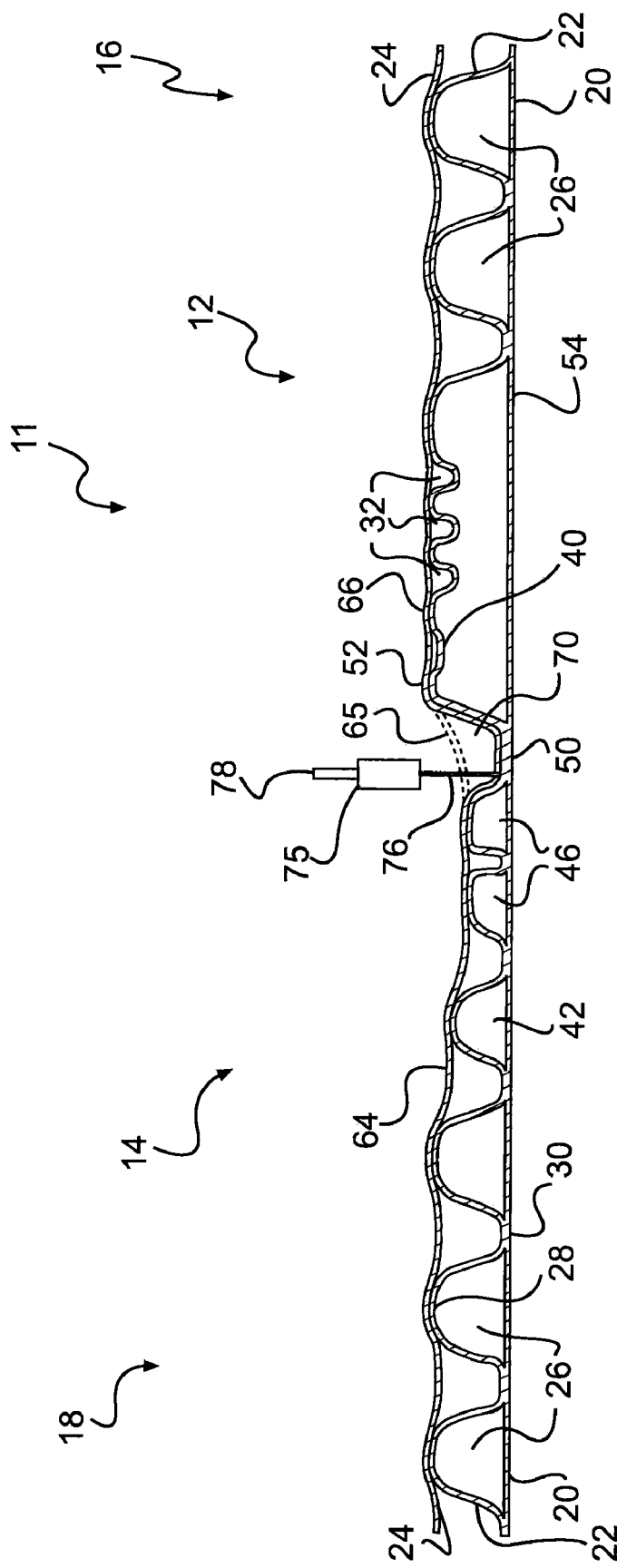
FIG. 1 is a partial, cross-sectional view of an exemplary coupling preform for joining two segments of three-wall, corrugated pipe, and a punch for deforming an outer wall of the three-wall, corrugated pipe.

FIG. 1 illustrates an exemplary, partial section of three-wall, corrugated pipe during manufacturing of an exemplary in-line coupling preform 11. The coupling preform 11 may have a bell portion 12 and a spigot portion 14 formed "in-line" with the rest of the three-wall corrugated pipe, after having been extruded from a cross-head die but before having been cut into separate portions. For example, three-wall corrugated pipe may be continuously manufactured into segments of pre-determined length (e.g. 10-30 feet), with adjacent segments 16, 18 having a coupling preform 11 formed therebetween. Each coupling preform 11 may then be severed between adjacent bell and spigot portions 12, 14, into pipe segments of the desired length, each having a bell portion 12 at one end and a spigot portion 14 at the other.

In the embodiment of FIG. 1, first and second corrugated pipe sections 16, 18 may be initially formed as dual-wall, corrugated pipe. For example, both first and second corrugated pipe sections 16, 18 may include an inner wall 20 and a corrugated wall 22, which may be co-extruded and then molded together on a corrugator. In another embodiment, inner wall 20 may be separately fused to the corrugated wall 22. The corrugated wall 22 may include a plurality of primary corrugations 26, each having respective primary corrugation crests 28 and primary corrugation valleys 30. This dual-wall, corrugated pipe may then be passed through a downstream, cross-head die, which extrudes an outer wall 24 onto the dual-wall pipe, as illustrated in FIG. 1, thereby creating three-wall, corrugated pipe. Because the outer wall 24 is extruded onto the corrugated wall 22 while it is still hot (i.e., in a melted or semi-melted state), it may be fused or cohesively bonded to primary corrugation crests 28 of the corrugated wall 22. In certain exemplary embodiments, the inner wall 20 may be substantially smooth, as illustrated in FIG. 1.

Referring in particular to the coupling preform 11, the bell portion 12 and the spigot portion 14 may be formed integrally with three-wall corrugated pipe, such that their assembly results in a coupling having a diameter substantially similar to that of the rest of the pipe. In other words, the outer diameter of the three-wall corrugated pipe may be substantially the same at the bell and spigot portions 12, 14 as the outer diameter at various locations of primary corrugations 26.

Specifically, the bell portion 12 may include the outer wall 24 and a portion of corrugated wall 22 having smaller bell corrugations 32 formed therein. For example, bell portion 12 may include three bell corrugations 32, which are configured to engage and retain protrusions of a sealing gasket. Bell portion 12 may also include an end corrugation 40 disposed proximate to an end portion of the bell, i.e., between bell corrugations 32 and a bell terminus 52. As further illustrated in FIG. 1, the height of bell corrugations 32, measured from the outer wall 24 to the bottoms of the bell corrugations 32, may be substantially less than the primary height of primary corrugations 26, measured from the outer wall to the bottoms of the primary corrugations 26 (primary corrugation valleys 30). Moreover, the height of end corrugation 40, measured from the outer wall 24 to the bottom of end corrugation 40, may be even less than the height of bell corrugations 32. End corrugation 40 may have a different shape than that of primary corrugations 26 and bell corrugations 32. More specifically, end corrugation 40 may have a substantially rectangular shape. Because of the reduction in height of bell corrugations 32, without a change in outside pipe diameter, first corrugated pipe section 16 may form an in-line, bell-shaped portion for receiving spigot portion 14.

Spigot portion 14 may include inner wall 20, a portion of corrugated wall 22 having smaller spigot corrugations 46 formed therein, and a portion of outer wall 24 drawn down over spigot corrugations 46. Spigot portion 14 may also include an intermediate corrugation 42 disposed between spigot corrugations 46, located adjacent spigot terminus 50, and primary corrugations 26 of second corrugated pipe section 18. As illustrated in FIG. 1, the height of spigot corrugations 46, measured from inner wall 20 to the top of spigot corrugations 46, may be less than the height of intermediate corrugation 42, measured from inner wall 20 to the top of intermediate corrugation 42. Moreover, the height of intermediate corrugation 42 may be less than the height of primary corrugations 26. Thus, outer wall 24 may be circumferentially tapered over spigot portion 14. Because of the reduction in corrugation height in the direction approaching spigot terminus 50, a decreased-diameter spigot portion 14 may be formed so as to telescopically engage the bell portion 12. Upon proper dimensional control of bell portion 12 and spigot portion 14, a water-tight seal may be formed therebetween.

As illustrated in FIG. 1, when the outer wall 24 is extruded over the corrugated wall 22, it may have a tendency of draping naturally over adjacent corrugations, thereby forming closed cavities between the corrugated wall 22, the outer wall 24, and adjacent primary corrugations 26. In the vicinity of the coupling preform 11, in particular, the outer wall 24 may have an intermediate portion 65 that drapes between the spigot corrugations 46 and the bell terminus 52, thereby forming an annular closed cavity 70 between an adjacent spigot portion 14 and bell portion 12. If the intermediate portion 65 cools and sets as it naturally lays when extruded across the spigot terminus 50 (i.e., as shown in dashed lines), it may be difficult to cut the coupling preform 11 along the spigot terminus 50 for the purpose of separating adjoining pipe sections between adjacent bell portions 12 and spigot portions 14. Specifically, a cutter would need to sever: (1) the outer wall 24 and the corrugated wall 22 at the bell terminus 52, (2) the intermediate portion 65 of the outer wall 24 at the spigot terminus 50, (3) the corrugated wall 22 and the inner wall 20 at the spigot terminus 50; and (4) the inner wall 20 near an inner wall terminus 54. Moreover, a secondary operation would be needed to address the flap the would be left in the outer wall 24 adjacent to the spigot corrugations 46.

As a result, it may be desirable to draw the intermediate portion 65 of the outer wall 24 down against the corrugated wall 22 at the spigot terminus 50. Any suitable method may be used for drawing down the intermediate portion 65 of the outer wall 24 onto the corrugated wall 22 at the spigot terminus 50. In one embodiment, a vacuum may be applied to the closed cavity 70 to draw the intermediate portion 65 down against the spigot terminus 50. For example, a vacuum punch 75 may be disposed downstream from the cross-head die used to extrude outer wall 24 onto the corrugated wall 22. Accordingly, the vacuum punch 75 may be configured to contact and/or punch into the intermediate portion 65, punctures the intermediate portion 65, and draw a vacuum on the closed cavity 70, by evacuating hot air from the closed cavity 70 through the punched hole in the outer wall 24.

Vacuum punch 75 will be described herein in embodiments in which the punch penetrates into the outer wall 24, and in embodiments in which the punch punctures an opening in the outer wall 24 without penetrating into the outer wall 24. Thus, vacuum punch 75 will be described in relation to embodiments in which vacuum punch 75 includes a hollow needle, and in embodiments in which vacuum punch 75 does not include a hollow needle.

In one embodiment, as shown in FIG. 1, the vacuum punch 75 may include a hollow needle 76 configured to translate radially relative to the outer diameter of the outer wall 24 of the pipe. The hollow needle 76 may be disposed in communication with a vacuum source 78. Thus, when the hollow needle 76 of the vacuum punch 75 translates radially inward into the closed cavity 70, the vacuum punch 75 may draw a vacuum on the closed cavity 70. When a vacuum is drawn on the closed cavity 70, a pressure differential may form across the intermediate portion 65 of the outer wall 24. Specifically, the pressure in the closed cavity 70 may decrease relative to the pressure outside the outer wall 24. Such a pressure differential may create an inward force on the intermediate portion 65, thereby drawing the intermediate portion 65 down, or "inward", toward the corrugated wall 22 at the spigot terminus 50.

In order to advantageously draw down the intermediate portion 65, the vacuum punch 75 may penetrate the outer wall 24 and draw a vacuum on the closed cavity 70 once the pipe is cool enough for the polymer to be cleanly punctured yet warm enough to fully deform against the corrugated wall 22 under the force of the vacuum. Moreover, a plurality of vacuum punches 75 may be disposed radially, about the circumference of the corrugated pipe. For example, in one embodiment, two or four vacuum punches 75 may be disposed evenly about the circumference of the corrugated pipe. In an alternative embodiment, sixteen vacuum punches may be disposed evenly about the circumference of the corrugated pipe. Thus, a plurality of vacuum punches may evenly draw a vacuum at various locations around the annular closed cavity 70.

FIG. 1 also illustrates the intermediate portion 65 of the outer wall 24 after it has been drawn down over, and fused, welded, or cohesively bonded to, the corrugated wall 22 at the spigot terminus 50 (i.e., as shown in solid lines), such that all three walls of the corrugated pipe are in contact between spigot portion 14 and bell portion 12 of coupling preform 11. Because the walls have been drawn down together, a scrap portion of coupling preform 11 (indicated by dashed lines in FIG. 5) may be easily removed by making cuts proximate to the spigot terminus 50, bell terminus 52, and inner wall terminus 54. Moreover, because the outer wall 24 has been fully drawn down against the end-most of the spigot corrugations 42, the spigot portion 14 is strengthened from having all three pipe walls present and joined at an end of the spigot portion 14. Still further, by drawing down the intermediate portion 65 onto the spigot terminus 50, the spigot portion 14 may be advantageously smoothed and tapered in a manner that facilitates the insertion of the spigot portion 14 into a bell portion 12 that has been fitted with a gasket.

Figure 2:
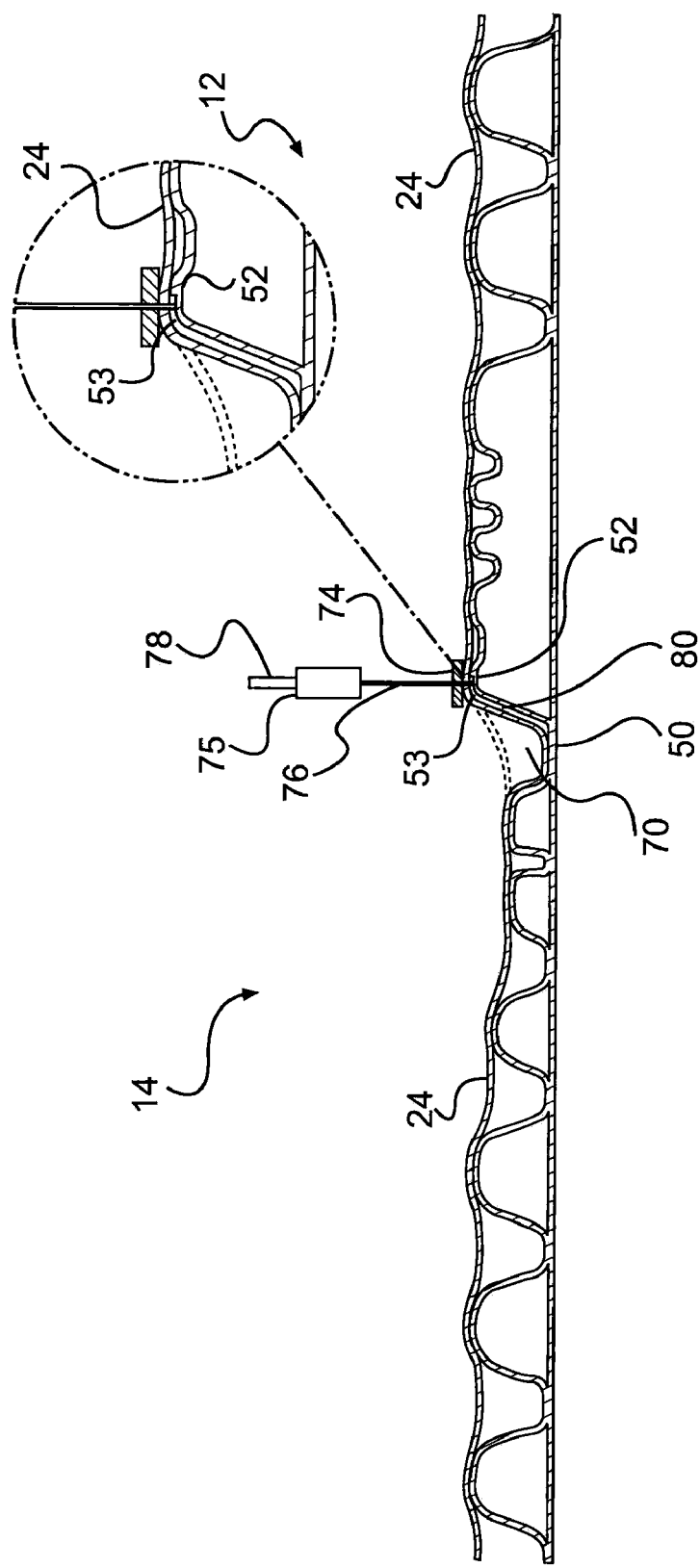
FIG. 2 is a partial, cross-sectional view of an alternative embodiment of an exemplary coupling preform for joining two segments of three-wall, corrugated pipe, and a punch for deforming an outer wall of the three-wall, corrugated pipe.

In another embodiment of the present disclosure, the vacuum punch 75 may be disposed over the bell terminus 52 rather than over the spigot terminus 50. For example, as illustrated in FIG. 2, the vacuum punch 75 may be configured to punch the outer wall 24 where its intermediate portion 65 contacts the end of the bell portion 12. In this embodiment, the vacuum punch 75 may be able to penetrate the outer wall 24 without having to travel as far inward radially toward the center of the closed cavity 70. However, in order to effect a vacuum in the closed cavity 70 by puncturing near the bell terminus 52 (instead of near the spigot terminus 50), a vacuum channel 80 may be formed in a portion of the corrugated wall 22 extending from the bell terminus 52 to the spigot terminus 50. As will be described more specifically with respect to FIG. 3, the vacuum channel 80 may be a groove in the corrugated wall 22 that preserves a fluid path between the outer wall 24 and the corrugated wall 22, extending from the closed cavity 70 at the spigot terminus 50 to a bell terminus gap 53.

FIG. 2 illustrates this embodiment in which the vacuum punch 75 punctures the outer wall 24 at the bell terminus gap 53. As a result, the vacuum source 78 of the vacuum punch 75 may draw a vacuum on the closed cavity 70 by inserting the hollow needle 76 into the top of the vacuum channel 80. As described with respect to FIG. 1, a plurality of vacuum punches 75 may be disposed radially, about the circumference of the corrugated pipe, and configured to puncture the outer wall 24 adjacent to the bell terminus 52. In such an embodiment, a vacuum channel 80 may be molded into the corrugated wall for every circumferential location at which a vacuum punch 75 is configured to puncture the outer wall 24 adjacent to the bell terminus 52.

As illustrated in FIG. 2, the vacuum punch 75 may also be fitted with a contact pad 74 around the hollow needle 76 in order to seal around an entry point of the hollow needle 76 into the outer wall 24. The contact pad 74 may be configured to ensure that a vacuum pressure drawn through the hollow needle 76 is fully transferred to the top of the vacuum channel 80, and therefore to the closed cavity 70. Moreover, the contact pad 74 may be configured to maintain the shape of the outer wall 24 around the hole formed in the outer wall 24 by the hollow needle 76, so as to prevent its deformation upon insertion and/or removal of the hollow needle 76. As will be described more specifically with respect to FIG. 4, the contact pad 74 may be provided with its own vacuum source in order to maintain sealing contact between the contact pad 74 and the outer wall 24.

In order to form a plurality of the vacuum channels 80 into the corrugated wall 22, corresponding geometry may be incorporated into the molds used to shape the corrugated wall 22. When the inner wall 20 and corrugated wall 22 are co-extruded into a corrugator, the geometry of the molds translated in the corrugator may be used to define the geometry resulting in the corrugated wall 22. Specifically, such molds may include an outer surface defining a mold housing and an inner surface defining a mold cavity configured to shape the pipe. For example, a plurality of axially-recurring, transversely-annular crests and valleys formed in the cavity of a mold housing may form the corresponding crests and valleys desired in a corrugated wall 22 of corrugated dual-wall pipe. In molds configured to form coupling preform sections, a plurality of axially-arranged flanges may extend radially-inward into cavities of the corrugator molds in order to form corresponding grooves, or vacuum channels 80, in the outside of corrugated wall 22.

Figure 3:
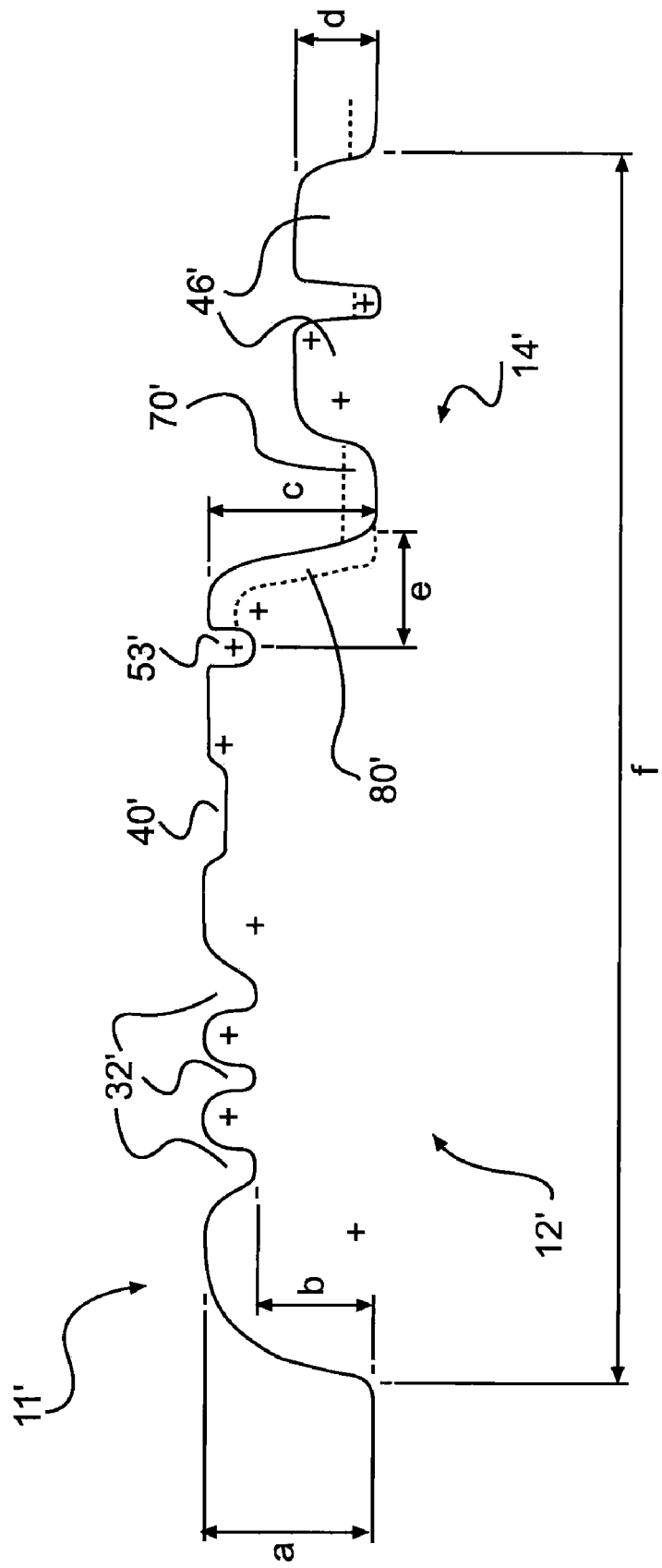
FIG. 3 is a partial, cross-sectional view of an exemplary mold profile for shaping a corrugated wall of the exemplary coupling preforms of FIGS. 1 and 2.

FIG. 3 illustrates an exemplary mold cavity geometry suitable for forming vacuum channels 80 in the corrugated wall 22 of a coupling preform 11, for example, as illustrated in FIG. 2. Specifically, FIG. 3 illustrates a coupling preform profile 11'. Coupling preform profile 11' may be formed into one of the corrugator molds in which a coupling preform 11 is desired to be formed. A mold having such a coupling preform profile 11' may be disposed at a predetermined interval of standard-shaped molds configured to form primary corrugations 26, having respective primary corrugation crests 28 and primary corrugation valleys 30. The exemplary disclosed coupling preform profile 11' may include a bell portion profile 12' having bell corrugation profiles 32' and a spigot portion profile 14' having spigot corrugation profiles 46'. The bell portion profile 12' may also include an end corrugation profile 40' and a bell terminus gap profile 53'. In order to form vacuum channels 80 in a corrugated wall 22 formed therein, the coupling preform profile 11' may also include a vacuum channel profile 80'.

The bell terminus gap profile 53' and vacuum channel profile 80' may modify the standard geometry of a mold in a way that creates a channel running from the upper bell terminus 52 of a corrugated wall 22 to the bottom of a closed cavity 70, which is formed when an outer wall 24 is extruded over the portion of corrugated wall 22 formed by a closed cavity profile 70' of the exemplary coupling preform profile 11'. Specifically, the bell terminus gap profile 53' and vacuum channel profile 80' may protrude into the mold cavity in which the corrugated wall 22 is molded, thereby forming an inwardly protruding bell terminus gap 53 and vacuum channel 80, as shown in FIG. 2. Moreover, as described above, the bell terminus gap profile 53' and vacuum channel profile 80' may be disposed at varying intervals radially about the circumference of a mold cavity to create a corresponding plurality of features in the corrugated wall 22.

In one embodiment, the coupling preform profile 11' may have a height "a" of approximately 2.0 to 4.0 inches and a length "f" of approximately 15.0 to 25.0 inches. The coupling preform profile 11' may also have an inner bell clearance "b" of approximately 1.0 to 3.0 inches, a channel height "c" of approximately 3.0 inches, a channel length "e" of approximately 2.0 inches, and a spigot corrugation height "d" of approximately 1.0 to 2.0 inches. However, it will be appreciated by one of skill in the art that any specific mold geometry may be used to create vacuum channels 80 in the corrugated wall 22, or any other wall of pipe, as desired. Accordingly, any suitable vacuum channels may be integrally formed in the multi-wall pipe in a manner that facilitates the drawing of a vacuum from a radially-disposed vacuum punch into any closed cavity in the pipe. For example, additional special vents may be formed in the corrugated wall 22 for the purpose of extending fluid communication of a vacuum from the vacuum channel 80 to the spigot corrugations 46.

Figure 4:
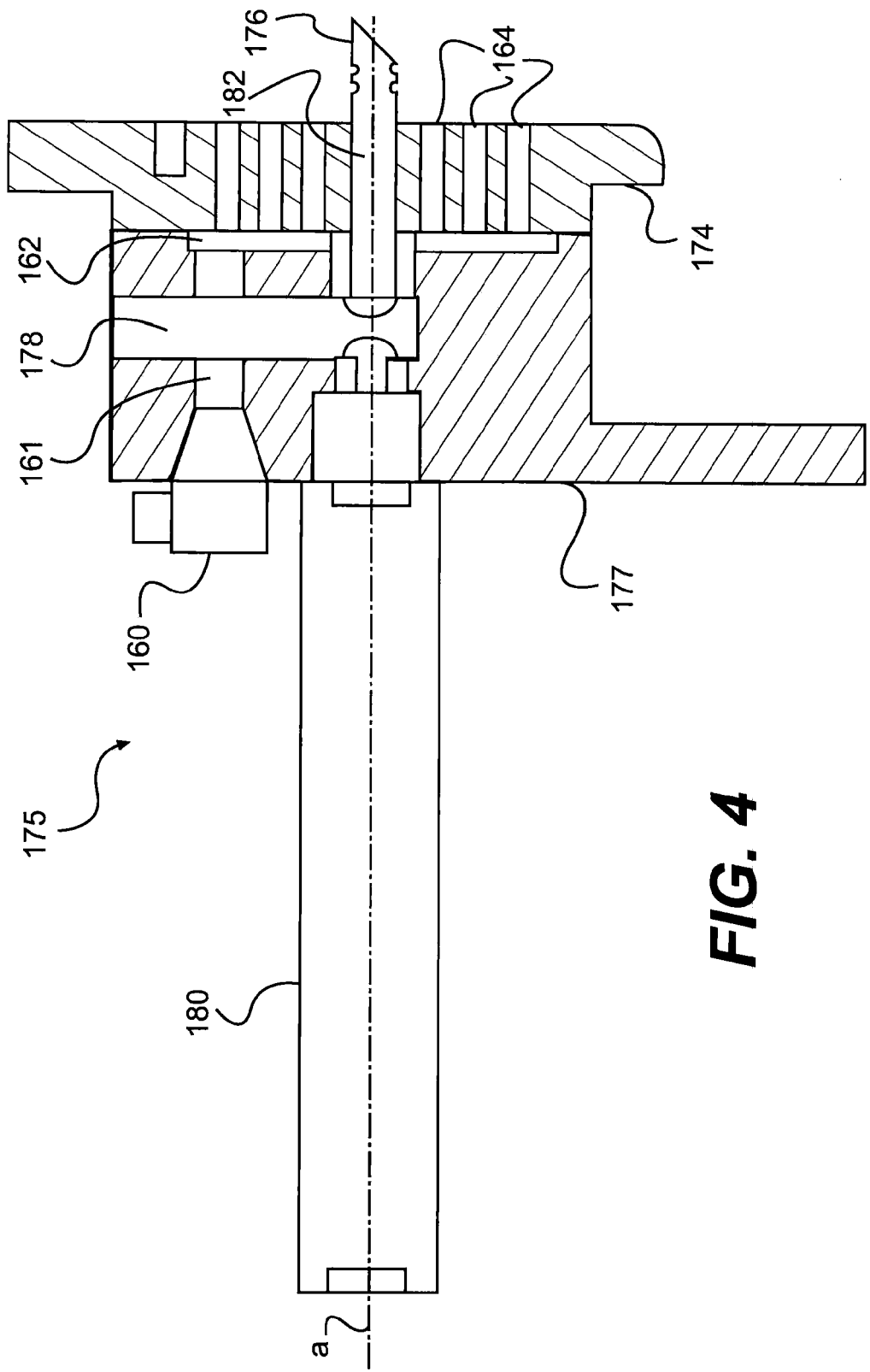
FIG. 4 is a cross-sectional view of an exemplary punch for deforming an outer wall of the exemplary coupling preforms of FIGS. 1 and 2.

FIG. 4 illustrates a cross-section of an exemplary vacuum punch 175 suitable for use in deforming an outer wall 24 of a corrugated polymer pipe, as described above with respect to FIGS. 1-3. In general, the exemplary vacuum punch 175 may include a punch housing 177, a clean out rod 180, and a hollow needle 176. The hollow needle 176 may have a vacuum conduit 182 therein, which may be selectively translated into fluid communication with a vacuum source 178, when translated along axis "a" as driven by a cylinder, which will be described in more detail with reference to FIGS. 10B and 10C.

The vacuum punch 175 may also be provided with an exemplary contact pad 174 around the hollow needle 176. The contact pad 174 may have a plurality of contact pad vacuum holes 164 disposed in communication with a contact pad gap 162 formed in a lower end of the punch housing 177. The punch housing 177 may also have a contact pad vacuum conduit 161 formed therein and configured to facilitate fluid communication between the contact pad gap 162 and a contact pad vacuum supply 160. Accordingly, the contact pad vacuum supply 160 may be configured to draw a vacuum on the contact pad vacuum holes 164 via the contact pad vacuum conduit 161 and the contact pad gap 162.

In operation, a plurality of vacuum punches, such as the exemplary vacuum punch 175, may be disposed downstream from a cross-head die that is configured to continuously-extrude an outer wall of polymer onto a corrugated dual-wall pipe passing through the cross-head die, in order to form three-wall pipe. The plurality of vacuum punches may be arranged radially about the circumference of the three-wall pipe. As described above, the three-wall pipe may have a coupling preform portion disposed in-line with the three-wall pipe at a pre-determined interval corresponding to a desired length of each pipe segment to be severed from the continuously-extruded pipe. As each coupling preform portion exits the cross-head die, the plurality of vacuum punches may be engaged, so as to puncture an outer wall of the three-wall pipe. For example, the vacuum punches may puncture the outer wall 24 at a spigot terminus 50, as described with respect to FIG. 1. Alternatively, the vacuum punches may puncture the outer wall 24 at a bell terminus 52, as described with respect to FIGS. 2 and 3.

Referring to FIG. 4, the contact pad 174 of each vacuum punch 175 may be brought in contact with a portion of the outer wall 24. The contact pad vacuum supply 160 may apply a vacuum to the contact pad 174 via the contact pad vacuum conduit 161 and the contact pad gap 162. The punch actuator 180 may then cause the hollow needle 176 to translate radially-inward towards a centerline of the three-wall pipe, so as to puncture the outer wall 24 and bring the vacuum conduit 182 in fluid communication with the vacuum source 178. The vacuum source 178 may then apply a vacuum to an area engaged by the hollow needle 176, such as the closed cavity 70 as described with respect to FIG. 1 or the bell terminus gap 53 as described with respect to FIG. 2. As a result of the vacuum, the intermediate portion 65 of the outer wall 24 may be drawn down from its original orientation (as shown in the dotted lines of FIGS. 1 and 2) such that it collapses and welds to the corrugated wall 22 at the spigot terminus 50 (as shown in the solid lines of FIGS. 1 and 2).

Figure 5:
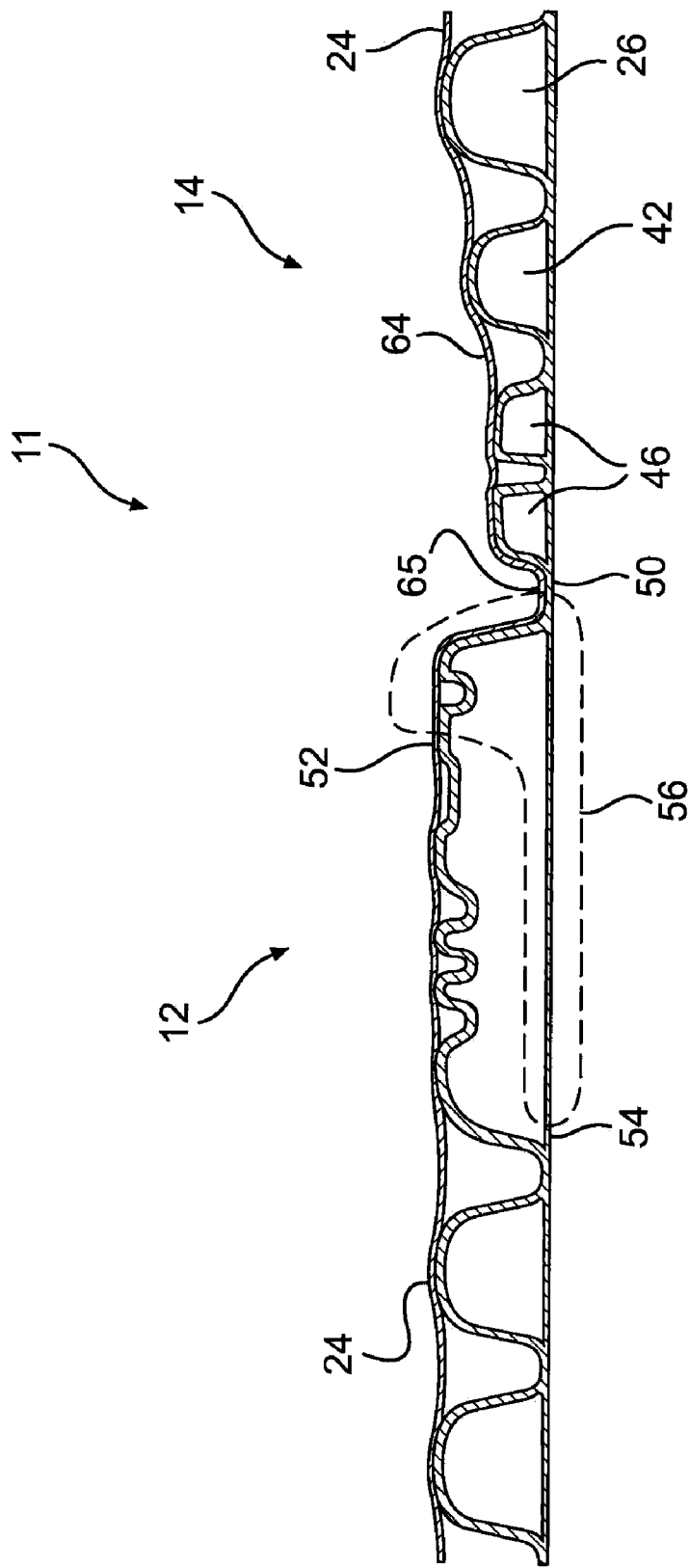
FIG. 5 is a partial, cross-sectional view of an exemplary three-wall, corrugated pipe having a coupling preform molded therein, which can be severed into an in-line bell and spigot coupling.

FIG. 5 illustrates the intermediate portion 65 of the outer wall 24 once it has been drawn down over, and fused, welded, or cohesively bonded to, the corrugated wall 22 at the spigot terminus 50, such that all three walls of the corrugated pipe are in contact between spigot portion 14 and bell portion 12 of coupling preform 11. Because the walls have been drawn down together, a scrap portion of coupling preform 11 (indicated by dashed lines) may be easily removed by making cuts proximate to the spigot terminus 50, bell terminus 52, and inner wall terminus 54. The need for only a single cut of the three walls at the spigot terminus 50 may eliminate the need for additional processing steps for removing excess outer wall 24 near the bell terminus 52. Moreover, because the outer wall 24 has been fully drawn down against the end-most of the spigot corrugations 42, the spigot portion 14 is strengthened from having, all three pipe walls present and joined at an end of the spigot portion 14. Still further, by drawing down the intermediate portion 65 onto the spigot terminus 50, the spigot portion 14 may be advantageously smoothed and tapered in a manner that facilitates the insertion of the spigot portion 14 into a bell portion 12 that has been fitted with a gasket.

FIG. 6A illustrates an exemplary coupling portion 10 that has been created by severing the coupling preform 11 as illustrated by the dashed lines in FIG. 5. Coupling portion 10 may then be configured to couple a first corrugated pipe section 16 and a second corrugated pipe section 18. In general, coupling portion 10 may include a bell portion 12 disposed on an end of the first corrugated pipe section 16 and a spigot portion 14 disposed on an end of the second corrugated pipe section 18. Coupling portion 10 may also include a gasket 34, for retaining and sealing spigot portion 14 within bell portion 12.

In the embodiment of FIG. 6A, gasket 34 engages a surface of outer wall 24 spanning two spigot corrugations 46. In alternative embodiments of the present disclosure, it is contemplated that gasket 34 may be configured to engage only one spigot corrugation 46 or many spigot corrugations 46. For example, in the event that gasket 34 engages a single spigot corrugation 46, it may be necessary to fill the corrugation with foam, or any other suitable reinforcing material to ensure sufficiently resilient support of gasket 34. For this reason, two smaller spigot corrugations 48, such as those illustrated in FIG. 6A, may be used to provide increased structural support (i.e., vertical corrugation walls) for sealing against gasket 34. Moreover, the length of sealing engagement between gasket 34 and outer wall 24 of spigot portion 14 may be any suitable length; however, in one exemplary embodiment, spigot corrugations 46 extend axially across 4-8 inches of pipe and are fused to a portion of outer wall 24. Gasket 34 may extend and overlap approximately 3-4 inches in the axial pipe direction of the portion of outer wall 24 fused to spigot corrugations 46, gasket 34 having a sealing surface 38 approximately 2-4 inches long. Thus, sealing surface 38 of gasket 34 may be configured to engage the outer wall 24 of spigot portion 14.

Gasket 34 may be any suitable type of annular, water-tight gasket. For example, gasket 34 may be a dual-elastomer gasket including any suitable type of material, such as rubber, polyethylene, Teflon, EPDM, nitrile, thermoplastic elastomers, isoprene, or other plastic compounds. Gasket 34 may also incorporate various metal inserts or rings, as necessary, to provide structural rigidity.

Although FIGS. 1, 2, 5, and 6A-6B illustrate one particular exemplary embodiment of the present disclosure, it will be appreciated by one of skill in the art that numerous other variations on the geometry of cooperating in-line bell and spigot portions are contemplated within the scope of this disclosure. Specifically, the vacuum punch and related methods disclosed herein may be applicable to the deformation of an outer wall of any geometry of corrugated pipe or coupling preform. For example, FIGS. 7A and 7B illustrate an alternative exemplary embodiment of cooperating in-line bell and spigot portions having alternative geometries for retaining one or more gaskets between in-line bell and spigot portions.

FIG. 7A illustrates an exemplary, partial section of three-wall, corrugated pipe during manufacturing of an exemplary in-line coupling preform 111. The coupling preform 111 may have a bell portion 112 and a spigot portion 114 formed "in-line" with the rest of the three-wall corrugated pipe, after having been extruded from a cross-head die but before having been cut into separate portions. For example, three-wall corrugated pipe may be continuously manufactured into segments of pre-determined length (e.g., 10-30 feet), with adjacent segments 116, 118 having a coupling preform 111 formed therebetween. Each coupling preform 111 may then be severed between adjacent bell and spigot portions 112, 114, into pipe segments of the desired length, each having a bell portion 112 at one end and a spigot portion 114 at the other.

In the embodiment of FIG. 7A, first and second corrugated pipe sections 116, 118 may be initially formed as dual-wall, corrugated pipe. For example, both first and second corrugated pipe sections 116, 118 may include an inner wall 120 and a corrugated wall 122, which may be co-extruded and then molded together on a corrugator. In another embodiment, inner wall 120 may be separately fused to the corrugated wall 122. The corrugated wall 122 may include a plurality of primary corrugations 126, each having respective primary corrugation crests 128 and primary corrugation valleys 130. This dual-wall, corrugated pipe may then be passed through a downstream, cross-head die, which extrudes an outer wall 124 onto the dual-wall pipe, as illustrated in FIG. 7A, thereby creating three-wall, corrugated pipe. Because the outer wall 124 is extruded onto the corrugated wall 122 while outer wall 124 is still hot (i.e., in a melted or semi-melted state), outer wall 124 may be fused or cohesively bonded to primary corrugation crests 128 of the corrugated wall 122. In certain exemplary embodiments, inner wall 120 may be substantially smooth, as illustrated in FIG. 7A.

Referring in particular to the coupling preform 111, the bell portion 112 and the spigot portion 114 may be formed integrally with three-wall corrugated pipe, such that their assembly results in a coupling having a diameter substantially similar to that of the rest of the pipe. In other words, the outer diameter of the three-wall corrugated pipe may be substantially the same at the bell and spigot portions 112, 114 as the outer diameter at various locations of primary corrugations 126.

As illustrated in FIG. 7A, bell portion 112 may include outer wall 124 and a portion of corrugated wall 122 joined together along a substantially straight sealing portion 133. Specifically, bell portion 112 may include a sealing portion 133 configured to engage and retain sealing surfaces 138 of gaskets 134 with an inner surface of corrugated wall 122, as illustrated in the detail view of FIG. 7B. Because bell portion 112 may include both outer wall 124 and corrugated wall 122 fused together along sealing portion 133, bell portion 112 may have increased strength and resistance to deformation as compared to a single layer bell portion. Bell portion 112 may also include one or more end corrugations 140 disposed proximate to an end portion of the bell, i.e., between sealing portion 133 and bell terminus 152.

Spigot portion 114 may include inner wall 120, a portion of corrugated wall 122 having spigot corrugations 146 formed therein, and a portion of outer wall 124 drawn down over spigot corrugations 146. Spigot portion 114 may also include intermediate corrugations 142 disposed between spigot corrugations 146, located adjacent spigot terminus 150, and primary corrugations 126 of second corrugated pipe section 118. As illustrated in FIG. 7A, the height of spigot corrugations 146, measured from inner wall 120 to the top of spigot corrugations 146 may be greater than the height of intermediate corrugations 142, measured from inner wall 120 to the top of intermediate corrugations 142. However, the height of spigot corrugations 146 may be less than the height of primary corrugations 126. Thus, a portion of outer wall 124 disposed around intermediate corrugations 142 may be the smallest diameter portion of the pipe, such that first corrugated pipe section 116 can articulate relative to second corrugated pipe section 118 without contact interference between bell terminus 152 and the portion of outer wall 124 fused to intermediate corrugations 142.

As illustrated in the embodiment of FIG. 7A, primary corrugations 126 and intermediate corrugations 142 may have generally curved shapes, including rounded shoulder portions. Likewise, spigot corrugations 146 may have generally curved profile shapes. However, spigot corrugations 146 may each include a groove 132 formed around its circumference. As shown in FIG. 7A, the portions 135 of outer wall 124 extending over grooves 132 may be removed, such that an engagement projection 133 of each gasket 134 may be inserted into a groove 132 of a spigot corrugation 146. Because outer wall 124 extends over and is fused to spigot corrugations 146 and intermediate corrugations 142 along their lengths, except at portions 135 over grooves 132, spigot portion 114 may have increased strength and resistance to deformation as compared to a spigot portion having only two walls. In the embodiment of FIG. 7A, spigot portion 114 includes two spigot corrugations 146, each having a gasket 134 inserted into its respective groove 132. However, it will be appreciated that spigot portion 114 may have any number of spigot corrugations 146. Moreover, each spigot corrugation 146 may be provided with any number of grooves 132 and gaskets 134, as desired. Spigot corrugations 146 may also be reinforced by the injection of foam into an interior of each of spigot corrugations 146. Because of the reduction in corrugation height of spigot corrugations 146 relative to primary corrugations 126, a decreased-diameter spigot portion 114 may be formed so as to telescopically engage the bell portion 112. Specifically, upon proper dimensional control of bell portion 112 and spigot portion 114, a water-tight seal may be formed therebetween.

As illustrated in FIG. 7A, when the outer wall 124 is extruded over the corrugated wall 122, outer wall 24 may have a tendency of draping naturally over adjacent corrugations, thereby forming closed cavities between the corrugated wall 122, the outer wall 124, and adjacent primary corrugations 126. In the vicinity of the coupling preform 111, in particular, the outer wall 124 may have an intermediate portion 165 that drapes between the spigot corrugations 146 and the bell terminus 152, thereby forming an annular closed cavity 170 between an adjacent spigot portion 114 and bell portion 112. If the intermediate portion 165 cools and sets as it naturally lays when extruded across the spigot terminus 150 (i.e., as shown in dashed lines), it may be difficult to cut the coupling preform 111 along the spigot terminus 150 for the purpose of separating adjoining pipe sections between adjacent bell portions 112 and spigot portions 114. Specifically, a cutter would need to sever: (1) the outer wall 124 and the corrugated wall 122 at the bell terminus 152, (2) the intermediate portion 165 of the outer wall 124 at the spigot terminus 150, (3) the corrugated wall 122 and the inner wall 120 at the spigot terminus 150; and (4) the inner wall 120 near an inner wall terminus 154. Moreover, a secondary operation would be needed to address the flap the would be left in the outer wall 124 adjacent to the spigot corrugations 146.

As a result, it may be desirable to draw the intermediate portion 165 of the outer wall 124 down against the corrugated wall 122 at the spigot terminus 150. Any suitable method may be used for drawing down the intermediate portion 165 of the outer wall 124 onto the corrugated wall 122 at the spigot terminus 150. As described with respect to the embodiment of FIG. 1, a vacuum may be applied to closed cavity 170 to draw the intermediate portion 165 down against the spigot terminus 150. For example, a vacuum punch 75 may be disposed downstream from the cross-head die used to extrude outer wall 124 onto the corrugated wall 122. Accordingly, the vacuum punch 75 may be configured to punch into the intermediate portion 165 and draw a vacuum on the closed cavity 170, by evacuating hot air from the closed cavity 170 through the punched hole in the outer wall 124.

However, as shown in the exemplary embodiment of FIG. 7A, the vacuum punch 75 may also be disposed adjacent to the bell terminus 152 rather than over the spigot terminus 150. For example, as illustrated in FIG. 7A, the vacuum punch 75 may be configured to punch the outer wall 124 where its intermediate portion 165 contacts the end of the bell portion 112. In this embodiment, the vacuum punch 75 may be able to penetrate the outer wall 124 without having to travel as far inward radially toward the center of the closed cavity 170. However, in order to effect a vacuum in the closed cavity 170 by puncturing near the bell terminus 152 (instead of near the spigot terminus 150), a vacuum channel may be formed in a portion of the corrugated wall 122 extending from the bell terminus 152 to the spigot terminus 150. As will be described more specifically with respect to FIG. 8, a vacuum channel 180 may be formed as a groove in the corrugated wall 122 that preserves a fluid path between the outer wall 124 and the corrugated wall 122, extending from the bell terminus gap 153 at bell terminus 152 to the closed cavity 170 at spigot terminus 150.

FIG. 7A illustrates this embodiment in which the vacuum punch 75 punctures the outer wall 124 at the bell terminus gap 153. As a result, the vacuum source 78 of the vacuum punch 75 may draw a vacuum on the closed cavity 170 by inserting the hollow needle 76 into the top of the vacuum channel 180 illustrated in FIG. 8. As described with respect to FIG. 1, a plurality of vacuum punches 75 may be disposed radially, about the circumference of the corrugated pipe, and configured to puncture the outer wall 124 adjacent to the bell terminus 152. In such an embodiment, a vacuum channel 180 may be molded into the corrugated wall for every circumferential location at which a vacuum punch 75 is configured to puncture the outer wall 124 adjacent to the bell terminus 152.

FIG. 7A also illustrates the intermediate portion 165 of the outer wall 124 after it has been drawn down over, and fused, welded, or cohesively bonded to, the corrugated wall 122 at the spigot terminus 150 (i.e., as shown in solid lines), such that the corrugated wall 122 and outer wall 124 are in contact between spigot portion 114 and bell portion 112 of coupling preform 111. Because the walls have been drawn down together, a scrap portion of coupling preform 111 (indicated by dashed lines in FIG. 7A) may be easily removed by making cuts proximate to the spigot terminus 150, bell terminus 152, and inner wall terminus 154. Moreover, because the outer wall 124 has been fully drawn down against the end-most of the spigot corrugations 142, the spigot portion 114 is strengthened from having all three pipe walls present and joined at an end of the spigot portion 114. Still further, by drawing down the intermediate portion 165 onto the spigot terminus 150, the spigot portion 114 may be advantageously smoothed and tapered in a manner that facilitates the insertion of the spigot portion 114 into a bell portion 112, once spigot portion 114 has been fitted with a gasket.

FIG. 7B illustrates an exemplary coupling portion 110 that has been created by severing the coupling preform 111 as illustrated by the dashed lines in FIG. 7A. Coupling portion 110 may then be configured to couple a first corrugated pipe section 116 and a second corrugated pipe section 118. In general, coupling portion 110 may include a bell portion 112 disposed on an end of the first corrugated pipe section 116 and a spigot portion 114 disposed on an end of the second corrugated pipe section 118. Coupling portion 110 may also include at least one gasket 134, for retaining and sealing spigot portion 114 within bell portion 112.

For instance, referring to both FIG. 7A and the detail of FIG. 7B, a sealing surface 138 of each gasket 134 may contact a sealing portion 133 of corrugated wall 122 fused to outer wall 124. Because corrugated wall 122 is smoothed against outer wall 124 along sealing portion 133, each gasket 134 may be disposed at a substantially similar diameter of spigot portion 114. However, if sealing portion 133 is profiled so as to change diameters along its length, then gaskets 134 may be disposed at corresponding diameters so as to ensure their sealing engagement with corrugated wall 122. The length of sealing engagement between gaskets 134 and corrugated wall 122 may be any suitable length; however, in one exemplary embodiment, spigot corrugations 146 may extend axially across 2-8 inches of pipe. Gaskets 134 may also extend and overlap approximately 2-8 inches in the axial pipe direction, each gasket 134 having a sealing surface 138 approximately 1-4 inches long. Thus, sealing surfaces 138 of each gasket 134 may be configured to engage the corrugated wall 122 of sealing portion 133 of bell portion 112.

Each gasket 134 may be any suitable type of annular, water-tight gasket. For example, gasket 134 may be dual-elastomer gaskets including any suitable type of material, such as rubber, polyethylene, Teflon, EPDM, nitrile, thermoplastic elastomers, isoprene, or other plastic compounds. Gasket 134 may also incorporate various metal inserts or rings, as necessary, to provide structural rigidity. As shown in the detail of FIG. 7B, each gasket 134 may include a V-shaped shoulder 136 configured to ease insertion of spigot portion 114 into bell portion 112 by minimizing the likelihood of rotating gasket 134. For example, each gasket 134 may be selected from one of the gasket types disclosed in U.S. Pat. No. 6,948,718 issued to William V. Shaffer and William C. Andrick on Sep. 27, 2005; U.S. Pat. No. 7,331,582 issued to William V. Shaffer and William C. Andrick on Feb. 19, 2008; or U.S. Pat. No. 7,185,894 issued to Kevin S. Kish and Pardeep K. Sharma on Mar. 6, 2007, (all assigned to Advanced Drainage Systems, Inc.).

Figure 8:
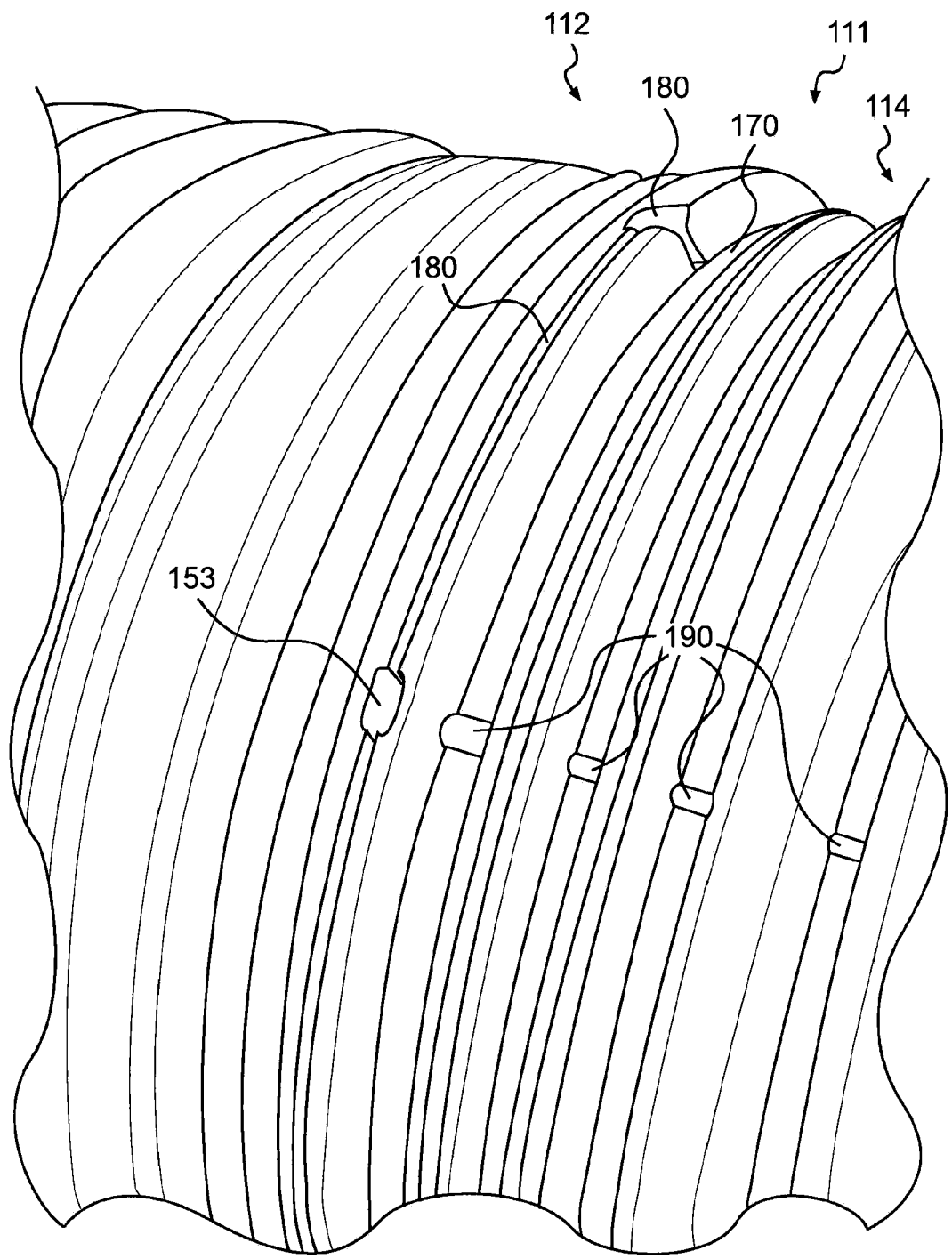
FIG. 8 is a partial, perspective view of the exemplary coupling preform of FIG. 7A before the outer wall has been extruded onto the dual-wall coupling perform.

FIG. 8 illustrates a partial, perspective view of the exemplary coupling preform 111 of FIG. 7A before the outer wall 124 has been extruded onto the dual-wall coupling preform. The coupling preform 111 may include a bell portion 112 and a spigot portion 114. As described with respect to FIG. 7A, bell portion 112 may include a bell terminus gap 153 into which vacuum punch 75 may be inserted after outer wall 124 is extruded onto the corrugated wall 122. Bell portion 112 may further include a vacuum channel 180 that provides a fluid passage from terminus gap 153 to closed cavity 170. Thus, vacuum punch 75 may be used to draw outer wall 124 down against corrugated wall 122 by insertion of the hollow needle 76 into the top of the vacuum channel 180, ultimately drawing a vacuum on closed cavity 170. As described with respect to FIGS. 1-3, any additional vacuum channels may be integrally formed in the multi-wall pipe in a manner that facilitates the drawing of a vacuum from a radially-disposed vacuum punch into any closed cavity in the pipe. For example, additional special vents 190 may be formed in the corrugated wall 122 for the purpose of extending fluid communication of a vent for venting volumes between the corrugated wall 122 and the inner wall 120 to the atmosphere.

Figure 9A:
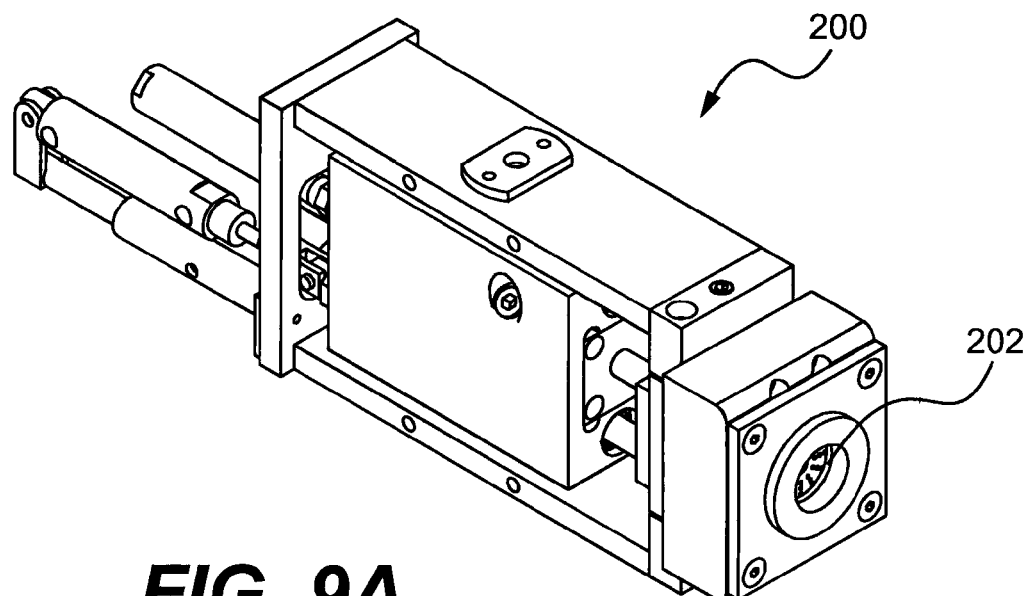
FIG. 9A is a perspective view of another exemplary punch for deforming an outer wall of the exemplary coupling performs.
Figure 9B:
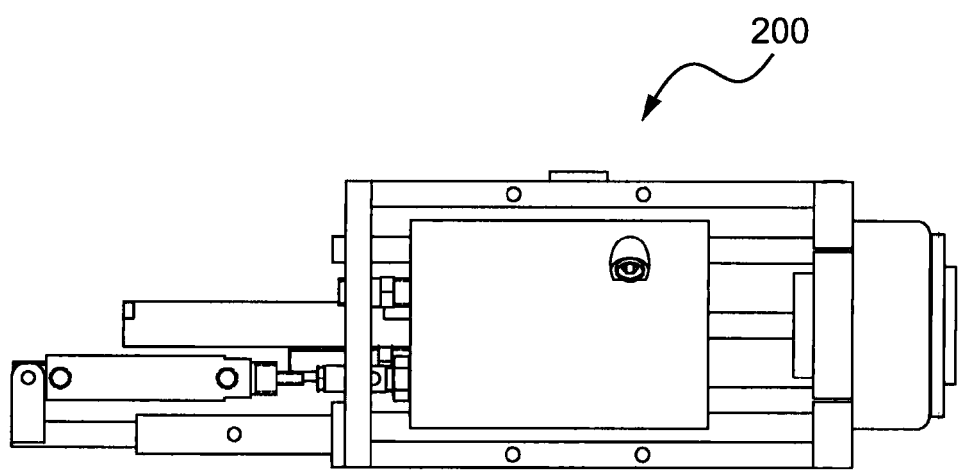
FIG. 9B is a side view of the exemplary punch of FIG. 9A.
Figure 9C:
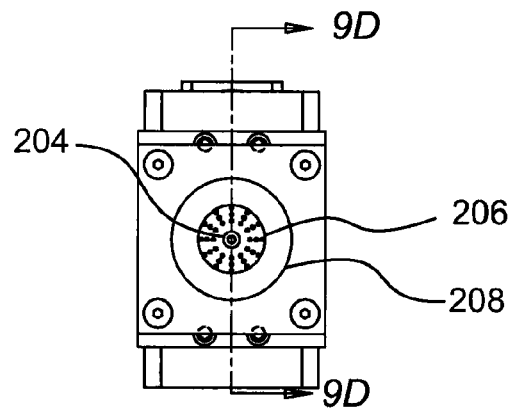
FIG. 9C is a front view of the exemplary punch of FIG. 9A.
Figure 9D:
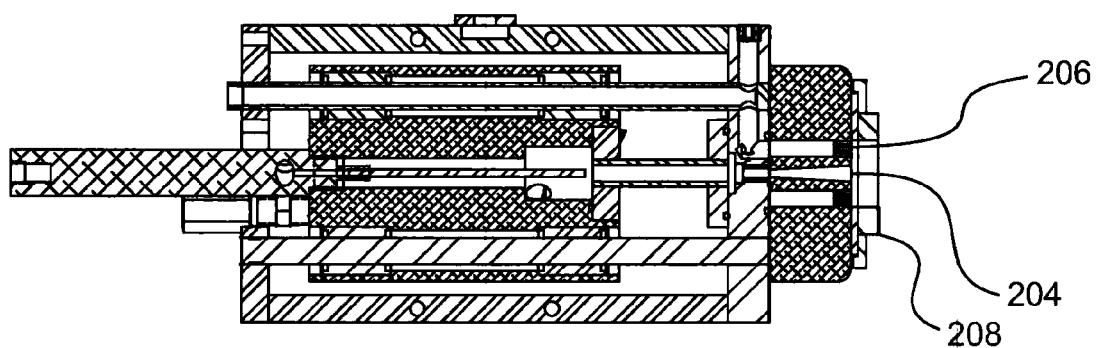
FIG. 9D is a cross-sectional side view of the exemplary punch of FIG. 9A.

FIG. 9A is a perspective view of another exemplary embodiment of a punch 200 for deforming an outer wall of the exemplary coupling performs, wherein the punch does not necessarily include a hollow needle configured for insertion into the outer wall 24. In particular, punch 200 includes a vacuum device 202 that is configured to draw a vacuum when pressed against the outer wall of pipe 24. FIG. 9B is a side view of the exemplary punch of FIG. 9A, and FIG. 9C is a front view of the exemplary punch of FIG. 9A. As shown in FIG. 9C, punch 200 may include a foam, rubber ring 208, which is configured to be pressed against outer wall 24 when punch 200 is conveyed radially toward a pipe. Punch 200 may also include a vacuum passage 204 and a perforated, vacuum pad 206 disposed in the middle of ring 208. In one embodiment, vacuum passage 204 may be a circular opening in the middle of vacuum device 202, while vacuum pad 206 and ring 208 may be disposed in consecutive, concentric, rings about vacuum passage 204. Punch 200 may be disposed in communication with a vacuum pump and configured to draw a vacuum on the perforations in vacuum pad 206 as well as the vacuum passage 204. Thus, in operation, punch 200 may be conveyed radially inward toward a newly-manufactured section of three wall pipe, such that ring 208 presses against an outer wall of the pipe. Punch 200 may then be actuated to draw a vacuum through vacuum pad 206 and vacuum passage 204, so as to create a pressure differential across the outer wall, which results in a thinning, and ultimately a puncturing of the outer wall. FIG. 9D is a cross-sectional side view of the exemplary punch of FIG. 9A, which illustrates the internal configuration of punch 200. As shown in FIG. 9D, vacuum passage 204 may be slightly conical, or frustro-conical, such that it widens in diameter in a direction toward the outer pipe wall.

Figure 10A:
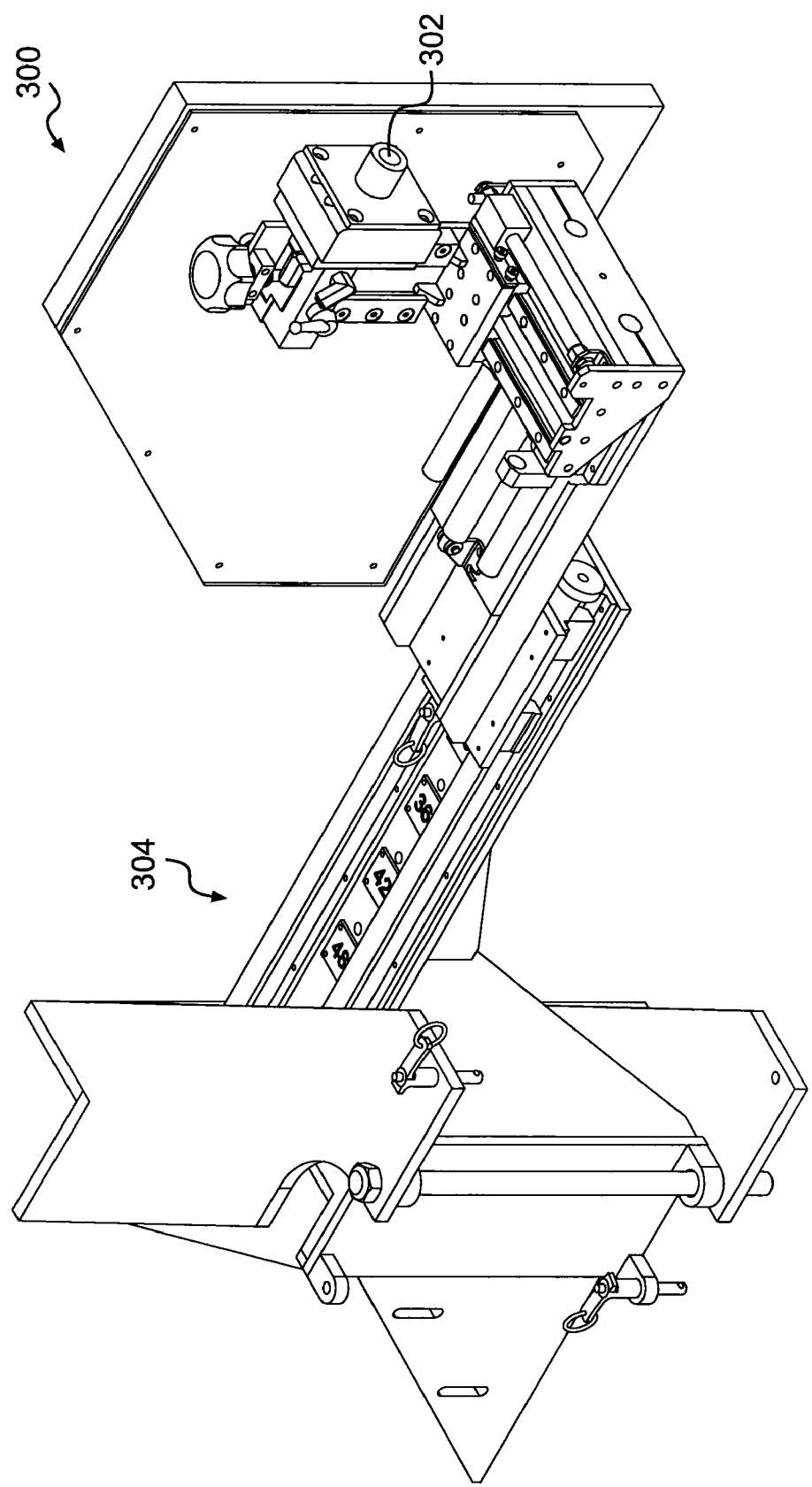
FIG. 10A is a perspective view of another exemplary punch for deforming an outer wall of the exemplary coupling performs.
Figure 10B:
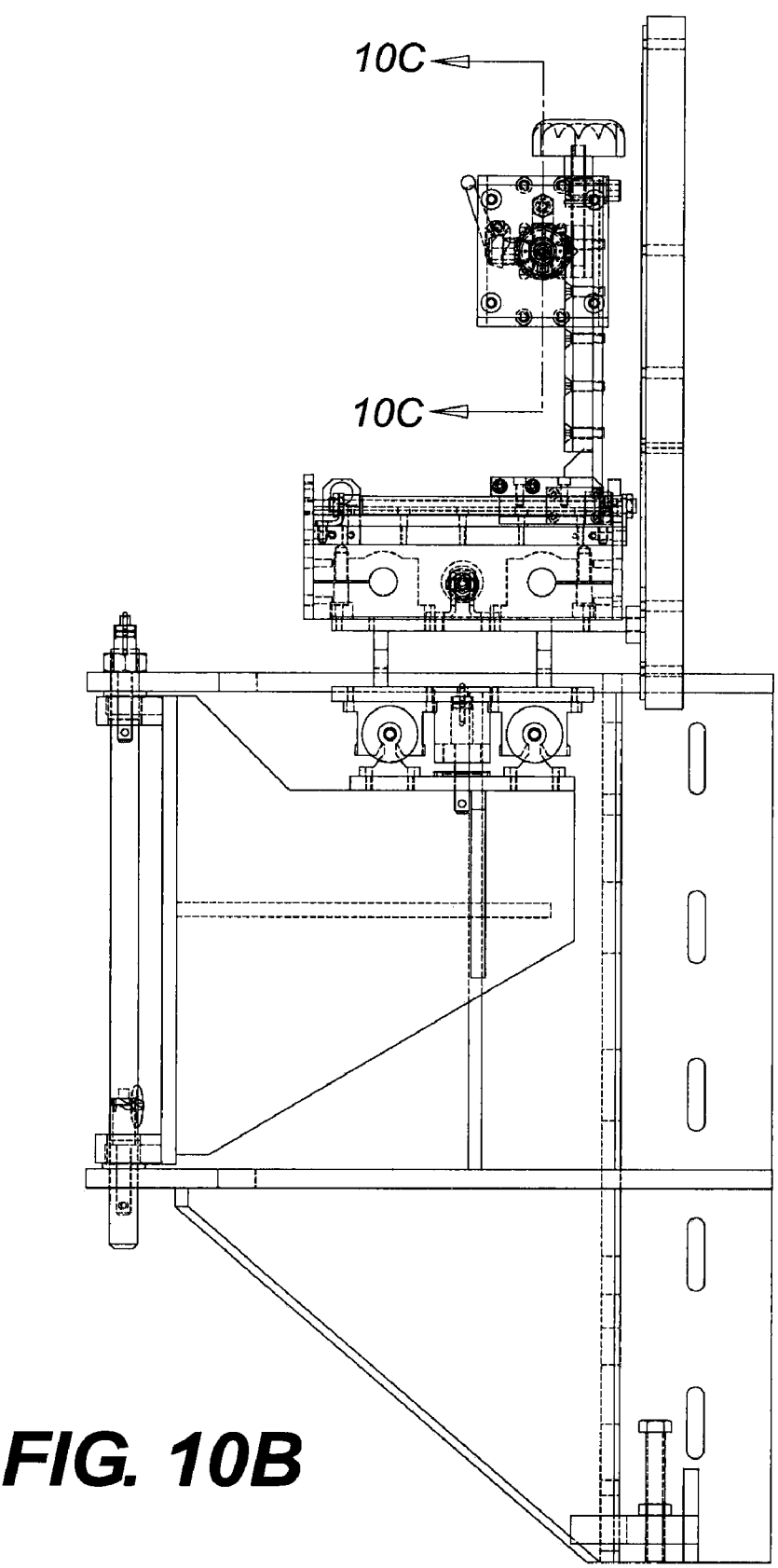
FIG. 10B is a front view of the exemplary punch of FIG. 10A.
Figure 10C:
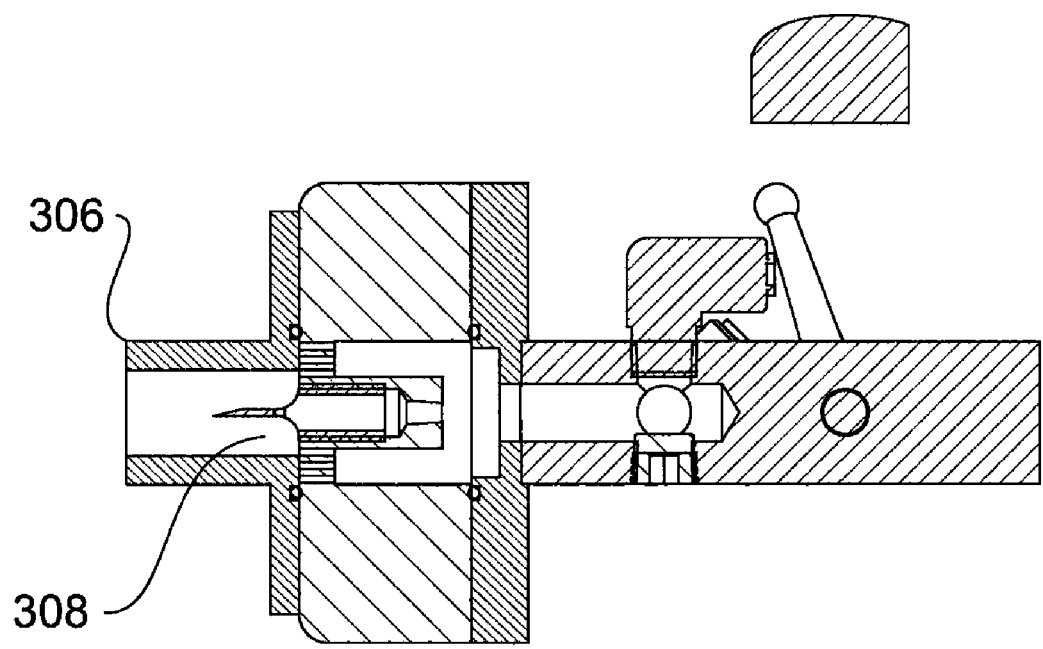
FIG. 10C is a cross-sectional detail view of the exemplary punch of FIG. 10A.

FIG. 10A is a perspective view of another exemplary punch 300 for deforming an outer wall of the exemplary coupling performs. In general, punch 300 may include a vacuum device 302 mounted to chassis 304, such that vacuum device 302 may be selectively translated radially inward toward and outward away from a pipe. Vacuum device 302 may be disposed in communication with a vacuum pump and configured to draw a vacuum against an outer wall of pipe when translated inward toward the pipe. FIG. 10B is a front view of the vacuum device 302 of FIG. 10A, and FIG. 10C is a cross-sectional detail view of the exemplary punch of FIG. 10A. As shown in FIG. 10C, vacuum device 302 may include a tubular element 306, which is mounted to a front end of vacuum device 302. Tubular element 306 may be disposed in fluid communication with the vacuum pump or other vacuum source of vacuum device 302. Tubular element 306 may also be positioned to contact the outer wall 24 when punch 300 and/or vacuum device 302 is translated inward toward the pipe. As further shown in FIG. 10C, tubular element 306 may have a sharp point 308 disposed therein. Sharp point 308 may be any suitable type of needle or dagger, such as a sharpened drill bit. Sharp point 308 may be positioned inside tubular element 306 such that it contacts and punctures a section of outer wall 24 drawn into the tubular element 306 by the vacuum induced therein. Thus, sharp point 308 may facilitate suitable puncturing of the outer wall 24 so that punch device 302 may draw a vacuum from the space behind the outer wall 24. In one embodiment, either or both of the tubular element 306 and sharp point 308 may be configured to translate relative to punch device 302, independently or together.

In view of the foregoing, it will be appreciated that either of punch 200 or punch 300 may be disposed relative to bell and spigot portions of a pipe, as shown in either of the configurations of FIGS. 1 and 2. That is, punches 200 and 300 may be positioned over annular closed cavity 70 between an adjacent spigot portion 14 and bell portion 12, or over bell terminus 52 and bell terminus gap 53. Thus, either of punch 200 and punch 300 may be positioned and configured to draw a vacuum against the outer wall 24, thereby puncturing a hole in the outer wall 24, and then drawing a vacuum on annular closed cavity 70, so as to draw down the outer wall 24 against the corrugated wall 22. A plurality of punches 200 and punches 300 may be positioned at various locations, radially, around the translating pipe. For example, two punches may be disposed at 180 degrees, on opposing sides of the translating pipe. Alternatively, four punches may be disposed at 90 degrees from each other around the translating pipe.

As will be appreciated by one of skill in the art, the presently disclosed coupling, pipe section, and methods may enjoy numerous advantages over previously known pipe coupling systems. First of all, because spigot portions 14, 114 include three walls (i.e., inner wall 20, 120, corrugated wall 22, 122, and outer wall 24, 124), one of ordinary skill in the art would expect spigot portions 14, 114 to be substantially stronger than previously known spigots. Specifically, spigot portions 14, 114 may be made more rigid, without the use of extensive or excessive amounts of material. Similarly, because bell portions 12, 122 include two walls (i.e., outer wall 24, 124 and corrugated wall 22, 122), one of skill in the art would expect bell portions 12, 112 to be substantially stronger than previously known bells formed from a single wall of material. In particular, bell portions 12, 112 and spigot portions 14, 114 may be stronger than competing products that require the use of even more plastic for forming certain pipe walls.

Because there may be no significant change in the outer diameter of the pipe proximate to bell portions 12, 112, a substantially constant-dimension trench may be dug along the length of the pipe installation. Spigot portion 14 may be designed in the interests of creating a larger sealing surface on spigot outer wall 64 and a stronger triple-wall structure. Spigot portion 114 may be designed in the interests of creating a larger sealing surface on sealing portion 133 of bell portion 112 and a stronger triple-wall structure. In each embodiment, creating this larger sealing surface may reduce the probability of misalignment between bell portions 12, 112, spigot portions 14, 114, and gaskets 34, 134, respectively, and may simplify the installation process.

Thus, an exemplary bell, spigot, and gasket disclosed herein may create an ASHTO-compliant, water-tight coupling, without the need for additional reinforcement means, such as straps, hinged clamps, or wraps. Nevertheless, in some embodiments, it may still be desirable to deform the outer wall of a bell portion 12, 112 after inserting a spigot portion 14, 114 into the bell portion 12, 112. Finally, an exemplary coupling may be substantially "in-line", thus creating a consistent and simple product, which may be easily transported to a jobsite and installed. This provides advantages in terms of reducing both material supplies and man-hours.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method of deforming an outer wall of polymer pipe, the method comprising:
    forming dual-wall pipe having a smooth wall and a corrugated wall;
    extruding an outer wall of pipe onto the corrugated wall of the dual-wall pipe;
    puncturing the outer wall of pipe with a vacuum punch; and
    drawing a vacuum between the corrugated wall and the outer wall via the vacuum punch;
    wherein the vacuum between the corrugated wall and the outer wall causes the outer wall to deform in a direction towards the corrugated wall.

2. The method of claim 1, wherein forming dual-wall pipe comprises co-extruding the smooth wall and corrugated wall into translating molds of a corrugator.

3. The method of claim 1, wherein extruding the outer wall of pipe comprises extruding the outer wall of pipe from a cross-head die disposed downstream from a corrugator.

4. The method of claim 1, wherein the step of puncturing the outer wall of pipe is performed while the outer wall is hot enough to deform when hot air is evacuated from between the corrugated wall and the outer wall.

5. The method of claim 1, wherein the step of drawing a vacuum is performed until the outer wall has contacted the corrugated wall in an area surrounding around the hollow needle.

6. The method of claim 1, wherein the dual-wall pipe comprises an in-line coupling preform made from the smooth wall and the corrugated wall, and
wherein puncturing the outer wall of pipe comprises inserting a hollow needle into a closed cavity defined between the outer wall and the corrugated wall of the in-line coupling preform.

7. The method of claim 6, wherein the in-line coupling preform comprises an in-line bell and an in-line spigot, and
wherein the closed cavity is further defined by a portion of the corrugated wall extending between the in-line bell and the in-line spigot.

8. The method of claim 1, wherein the dual-wall pipe comprises an in-line coupling preform comprising an in-line bell and an in-line spigot,
wherein the in-line coupling preform further comprises a channel extending from the in-line bell to the in-line spigot; and
wherein puncturing the outer wall of pipe comprises using the vacuum punch to puncture an end of the channel proximate to the in-line bell.

9. The method of claim 8, wherein the channel protrudes radially-inward into the corrugated wall and extends axially from the in-line bell to the in-line spigot; and wherein the in-line bell is disposed radially-outward from the in-line spigot, such that a tip of the vacuum punch is disposed radially-outward from the in-line spigot when the vacuum punch is positioned at the end of the channel proximate to the in-line bell.

10. A method of deforming an outer wall of polymer pipe, the method comprising:
forming dual-wall pipe having a smooth wall and a corrugated wall;
extruding an outer wall of pipe onto the corrugated wall of the dual-wall pipe;
puncturing the outer wall of pipe with a vacuum punch; and
drawing a vacuum between the corrugated wall and the outer wall via the vacuum punch, continuously until the outer wall has contacted the corrugated wall in an area surrounding the hollow needle;
wherein the vacuum between the corrugated wall and the outer wall causes the outer wall to deform in a direction towards the corrugated wall.

11. The method of claim 10, wherein forming dual-wall pipe comprises co-extruding the smooth wall and corrugated wall into translating molds of a corrugator.

12. The method of claim 10, wherein extruding the outer wall of pipe comprises extruding the outer wall of pipe from a cross-head die disposed downstream from a corrugator.

13. The method of claim 10, wherein the step of puncturing the outer wall of pipe is performed while the outer wall is hot enough to deform when hot air is evacuated from between the corrugated wall and the outer wall.

14. The method of claim 10, wherein the dual-wall pipe comprises an in-line coupling preform made from the smooth wall and the corrugated wall, and
wherein puncturing the outer wall of pipe comprises inserting a hollow needle into a closed cavity defined between the outer wall and the corrugated wall of the in-line coupling preform.

15. The method of claim 14, wherein the in-line coupling preform comprises an in-line bell and an in-line spigot, and
wherein the closed cavity is further defined by a portion of the corrugated wall extending between the in-line bell and the in-line spigot.

16. The method of claim 10, wherein the dual-wall pipe comprises an in-line coupling preform comprising an in-line bell and an in-line spigot, the in-line bell and in-line spigot each being made from the smooth wall and the corrugated wall;
wherein the in-line coupling preform further comprises a channel formed in the corrugated wall, the channel extending from the in-line bell to the in-line spigot; and
wherein puncturing the outer wall of pipe comprises using the vacuum punch to puncture an end of the channel proximate to the in-line bell.

17. The method of claim 16, wherein the channel protrudes radially-inward into the corrugated wall and extends axially from the in-line bell to the in-line spigot; and wherein the in-line bell is disposed radially-outward from the in-line spigot, such that a tip of the vacuum punch is disposed radially-outward from the in-line spigot when the vacuum punch is positioned at the end of the channel proximate to the in-line bell.

18. A method of deforming an outer wall of polymer pipe, the method comprising:
forming dual-wall pipe having a smooth wall and a corrugated wall, including an in-line coupling preform comprising an in-line bell and an in-line spigot, the in-line bell and in-line spigot each being made from the smooth wall and the corrugated wall, the in-line coupling comprising a channel formed in the corrugated wall, the channel extending from the in-line bell to the in-line spigot;
extruding an outer wall of pipe onto the corrugated wall of the dual-wall pipe;
puncturing the outer wall of pipe with a vacuum punch at an end of the channel proximate to the in-line bell; and
drawing a vacuum between the corrugated wall and the outer wall via the vacuum punch;
wherein the vacuum between the corrugated wall and the outer wall causes the outer wall to deform in a direction towards the corrugated wall.

19. The method of claim 18, wherein forming dual-wall pipe comprises co-extruding the smooth wall and corrugated wall into translating molds of a corrugator.

20. The method of claim 18, wherein extruding the outer wall of pipe comprises extruding the outer wall of pipe from a cross-head die disposed downstream from a corrugator.

21. The method of claim 18, wherein the step of puncturing the outer wall of pipe is performed while the outer wall is hot enough to deform when hot air is evacuated from between the corrugated wall and the outer wall.

22. The method of claim 18, wherein the step of drawing a vacuum is performed continuously until the outer wall has contacted the corrugated wall in an area surrounding the hollow needle.

23. The method of claim 18, wherein the dual-wall pipe comprises an in-line coupling preform made from the smooth wall and the corrugated wall, and
wherein puncturing the outer wall of pipe comprises inserting a hollow needle into a closed cavity defined between the outer wall and the corrugated wall of the in-line coupling preform.

24. The method of claim 23, wherein the in-line coupling preform comprises an in-line bell and an in-line spigot, and
wherein the closed cavity is further defined by a portion of the corrugated wall extending between the in-line bell and the in-line spigot.

* * * * *

UNITED STATES PATENT AND TRADEMARK OFFICE
CERTIFICATE OF CORRECTION

| | | |
|---|---|---|
| PATENT NO. | : 8,398,914 B2 | Page 1 of 1 |
| APPLICATION NO. | : 12/721196 | |
| DATED | : March 19, 2013 | |
| INVENTOR(S) | : Gerald S. Sutton | |

It is certified that error appears in the above-identified patent and that said Letters Patent is hereby corrected as shown below:

In the Claims:

Claim 5, col. 16, line 66, "an area surrounding around the hollow" should read --an area around the hollow--.

Signed and Sealed this
Second Day of July, 2013

Teresa Stanek Rea
*Acting Director of the United States Patent and Trademark Office*